United States Patent Office 2,916,357
Patented Dec. 8, 1959

2,916,357

NITRIC ACID LEACHING PROCESS

Felix A. Schaufelberger, Basel, Switzerland, assignor to American Cyanamid Company, New York, N.Y., a corporation of Maine No Drawing. Application November 7, 1957
Serial No. 694,933

4 Claims. (Cl. 23—200)

This invention relates to hydrometallurgical processing of iron-bearing minerals and alloys to recover substantially pure iron oxide therefrom. More specifically, the invention is concerned with precipitating high-purity iron oxide from solutions which contain iron and other metal nitrates to recover also the other metal or metals. As such, it constitutes a continuation-in-part of my co-pending application for U.S. Letters Patent, Serial No. 450,275, filed August 16, 1954, and now abandoned.

Increasing demand for iron has resulted in augmented studies of ores which are not readily amenable to treatment by usual methods. For example, iron bearing minerals in various degrees of concentration are found in extensive but undeveloped ore bodies variously referred to as lateritic, oxidized, siliceous or weathered-silicate ores. Such ores, being normally characterized by the substantial absence of sulfur or sulfides, often are, and herein will be, generically designated as "non-sulfide" ores.

In such deposits, iron and other mineral values occur as oxides or carbonates, usually basic, and/or as other partially broken-down silicates together with excessive amounts of siliceous gangue. Ordinarily, these ores vary in iron content, are quite high in aluminum content, and contain varied amounts, usually smaller, of such other metals as nickel, cobalt, copper, zinc, magnanese, chromium, lead, alkaline-earth metals and the like, the oxides of which are relatively insoluble.

It is a principal object of the present invention to recover iron from such ores by hydrometallurgy as a high-grade ferric oxide product, suitable for commercial utilization. It is a further object to recover values in metals other than iron, which may dissolve concomitantly therewith during leaching. Other objects and advantages will appear from the following description.

There has been an increasing interest in hydrometallurgical methods for the recovery of metals. Various methods have been proposed for leaching iron and/or non-ferrous metals from such ores. It some cases, basic solutions are employed, in others, acidic. The present invention is concerned primarily with the latter, and as noted above, with the use of nitric acid.

Nitrate leaching processes are known in the art. For example, there is a known process in which an oxidized calcine which contains ferrous and nonferrous metal values is leached at high temperature with nitric acid in amount insufficient to dissolve both ferrous and non-ferrous metal values. In another known process, an oxidized calcine is leached at low temperature with nitric acid in amount in excess of that required to dissolve both ferrous and non-ferrous metal values.

Leaching with limited amounts of nitric acid, at from about 160°–350° C., in an attempt to dissolve only non-ferrous metals, is not sufficiently selective for many purposes. It is most useful when iron is not primarily the product, a leach liquor which contains a suitable non-ferrous to ferrous metal ratio being obtainable at the expense of the recovery of iron. Extensive treatment of the solid residue after leaching is necessary to obtain a good iron product.

Excess nitric acid is used below the boiling point at atmospheric pressure to obtain maximum iron dissolution while allowing random dissolution of non-ferrous values. To effect metal separation, the leach liquor is heated to from about 250° to 350° C., to precipitate an iron oxide product. Calcining is necessary for good results, the product precipitate is difficult to collect, its non-ferrous metal content often is too high and non-ferrous metals recovery may be low.

It is, therefore, also an object of the present invention to develop a flexible process which is not subject to these limitations. This and the above-noted objects have been accomplished in a surprisingly effective manner using a modified excess acid leaching. Calcination is eliminated. An iron product sufficiently low in non-ferrous metal is obtained as well as good recovery of both the iron and the dissolved non-ferrous metals.

In the present invention, both leaching and iron precipitation procedures are balanced each with the other. In general, leaching is done at about 90–150° C., under pressure, in the presence of a free oxygen containing gas, using an excess of nitric acid in a liquor containing balanced amounts of iron and non-ferrous metal nitrates. Unlike the limited acid technique which employs comparable temperatures, excellent dissolution of both iron and non-ferrous metals is obtained.

Combined therewith is a modified precipitation step. Therein controlled heating, at generally lower temperatures than previously used, is employed to precipitate a controlled quantity of high-grade iron product. Rates of ore and acid feeding, liquor recycle and liquor discharge are balanced to maintain optimum conditions in continued operation.

Successful operation of the process differs most noticeably from the previous practice using excess acid in the control of iron precipitation and in the quality of iron product. Previously, the primary objective was to obtain maximum iron leaching preferably in minimum time, without particular attention to the extent of non-ferrous dissolution. Iron precipitation was operated on the same basis, maximum recovery in minimum time being stressed as the principal object.

As distinct therefrom, leaching in the present process is so controlled as to maintain active rates of dissolution of iron and also other metals values in proportion to their content in the ore. Moreover, iron precipitation in each cycle is controlled on the basis of product grade rather than recovery. As a result, an iron-bearing precipitate is obtained that is characterized by improved chemical and physical washing properties. It is free settling and easily collected by filtration or decantation. It comprises high purity, hard, black ferric oxide crystals, quite uniform in particle size, usually averaging about ten to fifteen microns, and having an average apparent density of about 2.5.

To obtain and maintain these desirable results, certain precautions are necessary in each stage since all must be in overall balance. Successful operation may be batchwise, semi-continuous or continuous. However, one of the features of the present process is its better adaptability for continuous use. It will be described, therefore, primarily on that basis.

As the first operation, leaching is flexible and may be varied. Except that nitric acid replaces sulfuric, the present practice in many respects resembles acid-oxidation leaching as used on sulfide ores. For example, somewhat lower but comparable temperatures of about 90°–150° C. may be used and the free oxygen containing gas is usually supplied at a partial pressure of oxygen of from 50 to 150 pounds per square inch gauge (p.s.i.g.) above the pressure autogenously developed. Both of these ranges may be increased or decreased if so desired. To do so is neither necessary nor desirable.

Definite limitations are few. A total pressure above the autogenous pressure must be maintained. Sufficient oxygen should be available to insure all dissolved iron being in the ferric state and to minimize consumption of nitric acid for oxidation. The oxygen over-pressure may be maintained with oxygen, oxygen-enriched air or air. Nitric acid should be present in stoichiometric excess of the iron plus non-ferrous metal values to be dissolved in any one cycle. Some 5 to 25% excess may be used. Usually it need not be more than about 10%.

In starting up, fresh nitric acid solution is usually employed. Some dissolved iron is removed and all the resultant liquor is recycled. In a batch or semi-continuous operation, this "total recycle" is continued until the solution content of non-ferrous metal, for example, nickel, cobalt and/or chromium, adversely affects the leaching rate, usually some two to five cycles.

Thereafter, part or all of the solution is withdrawn from the circuit and treated to recover non-ferrous metal values and nitric acid. This is replaced with make up acid, starting a new leaching series. However, a better method is available in the present invention. Before the non-ferrous metal content reaches this degree of concentration, the flow is divided, a portion being sent to the nitric acid and non-ferrous metals recovery, the remainder being recycled. Factors controlling the flow division will be discussed below.

Leach slurry is cooled, pressure relieved and decanted or filtered to remove residual insolubles. When, for example, an illustrative lateritic iron ore is leached, any siliceous gangue will be substantially unattacked and is thus eliminated. After the separation of undissolved residue, the withdrawn mixed nitrate solution may be treated directly to precipitate iron. However, since it contains excess nitric acid, this would be wasteful.

In the practice of this invention, therefore, this excess nitric acid is usually neutralized at least in part with fresh ore. This neutralizing step is usually done at temperatures below those customarily used in the initial leaching; usually about 60–80° C. There is an excess of ore and usually only the easily dissolved iron minerals are selectively attacked. Normally this produces a substantial increase in dissolved iron content but little change in non-ferrous metal content. Resultant incompletely leached ore is collected and recycled to the initial leaching.

Solution of increased iron-content is sent to iron oxide precipitation. Other methods are available, if so desired, to recover not only the excess, the free nitric acid after leaching but also nitric acid associated with non-ferrous metals in the residual solution after iron precipitation. One such method is to add sulfuric acid thereto, followed by distillation.

Clarified mixed nitrates liquor is heated to precipitate an iron oxide product. The temperatures used will exceed 50° C. and in most cases the boiling point at atmospheric pressure. Since boiling must be prevented, a closed pressure vessel is used. As in leaching, any vessel which can maintain a total pressure above the autogenous pressure at the operating temperature may be employed. In some cases an oxygen atmosphere may be used. If so the oxygen overpressure must be maintained also. Temperatures above 250° C. and total pressure exceeding about 500 p.s.i.g. should be avoided. Excessive temperatures cause poor product quality. While pressures up to 1000 p.s.i.g. or more, may be used, excessive overpressures do not aid in the reaction. Generally, a total pressure of from about 70 to about 400 p.s.i.g. and a temperature of from about 150° C. to about 230° C. are preferred.

While the present process is flexible within the indicated limits; the several steps must be controlled or optimum results are not obtained. For example, the extent to which ferric nitrate is decomposed and iron oxide precipitated requires consideration of several factors. Among others, these include (a) ferric nitrate concentration; (b) concentration of free nitric acid; and (c) the operating temperature. If these factors are not correctly balanced, the sequence of the active leaching, iron oxide precipitation and the acid recycle cannot be maintained.

An illustration of the effect of these factors is given in the following table. It shows, in grams per liter, illustrative equilibrium concentrations of ferric ions and of free nitric acid, at increasing temperatures, for three solutions made up to illustrative concentrations approximating 0.5, 1.0 and 1.5 mols per liter. No nitric acid as such was added.

TABLE I

*Dissolved ferric nitrate*

| Temperature, Degrees C. | 0.49 M/l. | | 1.11 M/l. | | 1.48 M/l. | |
|---|---|---|---|---|---|---|
| | Solution Content (gms./liter) | | | | | |
| | Fe$^{+++}$ | HNO$_3$ | Fe$^{+++}$ | HNO$_3$ | Fe$^{+++}$ | HNO$_3$ |
| 25 | 27 | 0 | 62 | 0 | 83 | 0 |
| 145 | 11.4 | 52 | 58 | 0 | | |
| 160 | 4.5 | 70 | 50 | 40 | | |
| 175 | 2.1 | 85 | 29 | 89 | 58 | 83 |
| 200 | 0.7 | 90 | 13 | 142 | 27 | 192 |
| 220 | | | 4 | 175 | 8 | 255 |

This illustrates the effect of temperature on the extent of iron oxide precipitation for a solution of known original content. For example, a solution which at 25° C. contains no free acid and about 83 g.p.l. of iron as ferric nitrate, will if heated to 175° C. retain only about 58 g.p.l. of iron, 24 g.p.l. having precipitated as the oxide with liberation of 83 g.p.l. of nitric acid. If heated to about 220° C., only 8 g.p.l. would be retained and about 75 g.p.l. would be precipitated.

Expressed in general terms, for any original concentration of ferric nitrate, there is a minimum temperature at which ferric nitrate begins to decompose and iron oxide to precipitate. As the temperature is increased above the minimum, both the rate and the extent of precipitation will increase progressively. In practicing this invention, the minimum useful temperature as noted above, will be about 50° C. for dilute solutions and the practical minimum will be more nearly 150° C. The useful maximum will be below 250° C. and the practical maximum usually will be about 225°–230° C.

But not all concentrations may be treated over the whole range of temperatures from 50° to 230° C. For example, while solutions containing less than 0.5 mol per liter (M/l.) of ferric nitrate may undergo considerable precipitation as low as about 50° C., from solutions initially containing one M/l. or more, precipitation at 50° C. is negligible. At about 150° C. precipitation occurs at substantially all initial concentrations. At still higher temperatures, solutions initially containing 0.5 M/l. or less will become substantially barren in ferric nitrate at about 200° C. or less, whereas those containing 1 M/l. or more may require temperatures up to 230°–250° C. to reach an equally low ferric iron content. In the present invention, selection of the correct temperature between about 50° C. and about 230° C. provides a critical control.

Heating to a selected temperature between 50° and 230° C. may not appear radically different from the prior practice using one in the range of some 200°–350° C. However, despite the seeming overlap, not only is the range as a whole generally lower, but for any one solution, the temperature will be much lower than would have been selected according to the prior practice of choosing a temperature which will insure complete precipitation.

It is this distinction which enables the present process to produce the desired high grade iron product not previously obtainable. Leach solutions being treated contain not only ferric but also non-ferrous metal nitrates. While ferric nitrate will decompose preferentially on heating, other dissolved metal nitrates can and will decompose to insoluble precipitates if they are present in sufficiently high mol ratio to the dissolved ferric iron.

In the present invention, therefore, for any mixed nitrate leach liquor there is a minimum temperature between 50° C. and 150° C. at which a useful amount of iron product forms. There is also for the same liquor a maximum useful temperature between about 150° and about 235° C. at which the residual dissolved ferric iron content becomes sufficiently low in relation to dissolved non-ferrous metal nitrate content that the preferential nature of the reaction is overcome. At temperatures above this maximum, co-precipitation of iron oxide and insoluble compounds of the non-ferrous metals will occur.

This useful maximum temperature is easily determined for any particular leach liquor. It is about that temperature at which the mol ratio of dissolved ferric iron to dissolved other metals approaches unity, and co-precipitation can occur. Once determined, the temperature during iron precipitation should not exceed this value and the maximum preferably should be below this figure by at least two degrees or more. This control is critical to insure precipitation of only the desired quality of iron product. As an operating temperature, it will be well below that chosen in prior practice 250° and 350° C. which would substantially strip the solution of iron in minimum time.

Although the process of the present invention has been described with reference to the recovery of an iron oxide product of good purity, attendant benefits emanate from my process through the separation and recovery of valuable non-ferrous metal values such as nickel, cobalt, copper, lead, manganese, magnesium, chromium, aluminum and the like.

The present invention also contemplates the treatment of an iron alloy. An iron alloy, for example, ferronickel, is treated with a stoichiometric excess of aqueous nitric acid under an oxygen partial pressure in a closed vessel. This causes dissolution of the alloy. The resulting solution is then heated to a temperature above the boiling point but below about 250° C. which is chosen as discussed above, to insure high purity of the precipitated iron oxide. Precipitated iron oxide is separated from the solution and the residual liquor processed in the same manner as discussed for the ore treatment.

The operation of the invention is illustrated by the following examples. Except as otherwise noted, all percentages are by weight and parts are per liter of liquor.

EXAMPLE 1

A Cuban lateritic ore was found to contain

| Component | Percent | Component | Percent |
|---|---|---|---|
| Iron | 46.6 | Aluminum | 3.75 |
| Nickel | 1.4 | Magnesium | 1.8 |
| Cobalt | 0.13 | Manganese | 1.1 |
| Chromium | 1.9 | Silica | 5.8 |

One hundred and fifty parts of ore was slurried in aqueous nitric acid (300 parts) and stirred for three hours at 90° C. under 50 p.s.i.g. maintained with oxygen. The solids residue containing 9% of the nickel plus cobalt, 17% of the iron, 50% of the aluminum, manganese and magnesium, 50% of the chromium and all of the silica was separated from the solution and treated for the recovery of the non-ferrous metal values. Leach liquor containing 59 parts iron, 2.1 parts nickel plus cobalt, 5 parts manganese plus magnesium and aluminum, 1.4 parts chromium, and 6.5 parts nitric acid, was heated for one hour in an autoclave at 210° C. cooled rapidly to room temperature and the precipitated solids were separated. The precipitated solids separated from the solution by filtration comprised black crystals of substantially pure iron oxide which contained 69% iron, less than 0.2% nickel plus cobalt and less than 0.5% manganese plus silicon, chromium and aluminum, having an average apparent density of 2.5 and averaging in size from 10 to 15 microns.

Clarified solution, containing 2.5 parts nitric acid, 1.4 parts iron, and the dissolved non-ferrous metal values, was recycled to the leaching step with an additional batch of ore and make-up nitric acid. The procedure was repeated for five cycles. Thereafter, about 80% of the solution was returned in each cycle and the remainder was withdrawn and processed for the recovery of nitric acid and the dissolved nickel and cobalt values. Nitric acid was removed from withdrawn solution by adding sulfuric acid thereto and distilling. For purposes of this test, iron was precipitated from resultant sulfate solution by hydrolysis as a hydrated ferric oxide and removed. Thereafter, dissolved nickel and cobalt values were jointly precipitated from the residual solution as their sulfides by known methods. Overall recoveries of about 90% of the nickel and cobalt as their sulfides and 85% of the iron as high grade ferric oxide were obtained.

EXAMPLE 2

Another portion of the same Cuban lateritic ore employed in Example 1 was used. About 185 parts were slurried in recycle nitrate liquor which analyzed 1.5 parts iron, 10.5 parts nickel plus cobalt, 22 parts manganese, aluminum and magnesium, 6 parts chromium and 280 parts free nitric acid, to which was added about 105 parts of nitric acid solution, 50% concentration. The slurry was agitated for 24 hours at about 90° C. under a partial pressure of oxygen of about 50 pounds per square inch to dissolve about 95% of the nickel plus cobalt; 88% of the iron; and some 50% of the other elements. Treated slurry was filtered and the undissolved residue was separated by filtration. The filtrate, which contained 73.5 parts iron; 10.5 parts nickel plus cobalt; 23 parts manganese plus aluminum and magnesium; 6.2 parts chromium and 75 parts free nitric acid, was treated with 75 parts of fresh ore at 80° C. for about five hours. The mixture was settled and decanted. The liquor was found to contain 85 parts iron; 30 parts nitric acid and a substantially unchanged non-ferrous metal values content. The incompletely leached solids were recycled to the first leach operation.

After heating resultant solution at 215° C. for about one hour, about 100 parts of iron oxide was precipitated and removed. Residual liquor analyzed 15 parts iron; 10.5 parts nickel plus cobalt; 22 parts manganese plus aluminum and magnesium; 6 parts chromium and 280 parts free nitric acid. Repeating the further processing by recycling 80% of the liquor as in Example 1 resulted in an overall recovery of 87% of the iron and 95% of the nickel plus cobalt.

EXAMPLE 3

A sample of a Spanish iron ore contained:

| Component | Percent | Component | Percent |
|---|---|---|---|
| Iron | 32 | Aluminum | 15 |
| Lead | 2.3 | Magnesium | 0.4 |
| Manganese | 1.3 | Silica | 29 |

About 335 parts of this ore was slurried in nitrate recycle liquor which contained 20 parts iron, 23 parts lead, 12 parts manganese, 63 parts aluminum plus magnesium and 250 parts free nitric acid and to which was added 47 parts of nitric acid solution of 40% concentration. The resultant slurry was agitated for three hours at 100° C. and about 150 pounds per square inch pressure maintained with air, thereby dissolving about 98% of the lead, 80% of the iron, 90% of the manganese and about 50% of the aluminum and magnesium. Undissolved residue was separated from the solution. The leach solution contained 79 parts iron; 23 parts lead; 12 parts manganese; 63 parts aluminum plus magnesium and 30 parts free $HNO_3$. The solution was heated to 210° C. to precipitate black, crystalline ferric oxide which was separated by filtration. Residual clarified solution contained 20 parts iron; 250 parts nitric acid and substantially all the dissolved non-ferrous metal values. Seventy-five percent of the solution was recycled. The remaining twenty-five percent was further processed to recover the lead, manganese, aluminum and magnesium and nitric acid by standard methods.

EXAMPLE 4

A finely divided, ilmenite ore contained 30% $FeO.TiO_2$; 42% $Fe_2O_3$; 5% magnesium plus calcium; 4% aluminum and 12% silica. About 315 parts of this ore were slurried in nitric acid solution, 373 parts $HNO_3$ and heated at 130° C. under 100 pounds per square inch of oxygen for four hours. Ninety percent of the $Fe_2O_3$, magnesium and calcium and 50% of the aluminum dissolved in the solution. Substantially no ilmenite mineral, $FeO.TiO_2$, was dissolved and the undissolved residue constituted an ilmenite concentrate in which the $TiO_2$ content was increased from about 15.8% in the ore to about 28.3%. This was an acceptable feed for titanium pigment manufacture. The solution, which contained 82 parts iron; 20.5 parts magnesium plus calcium and aluminum; and 25 parts free $HNO_3$, was heated at 215° C. for about 40 minutes. The mixture was then cooled and filtered. Pure ferric oxide was recovered as a precipitate. The filtrate contained 13 parts iron; 20 parts magnesium, calcium and aluminum and 260 parts free $HNO_3$. A major portion of the solution was recycled to the first leach step and the remainder was processed for the recovery of nitric acid.

EXAMPLE 5

A finely ground taconite ore contained:

| Component | Percent | Component | Percent |
|---|---|---|---|
| $Fe_2O_3$ | 27.9 | CaO | 1.9 |
| FeO | 15.31 | $Al_2O_3$ | 1.2 |
| MgO | 16 | $SiO_2$ | 49 |

About 172 parts of this ore were leached with nitric acid solution, 193 parts $HNO_3$, at 150° C. and under a partial pressure of oxygen of 150 pounds per square inch for 3 hours to dissolve about 90% of the iron, magnesium, calcium and aluminum. After separation of the undissolved residue by filtration, the solution which contained 48 parts iron; 3.6 parts magnesium, calcium and aluminum; and 17 parts free $HNO_3$, was heated at 195° C. for 35 minutes under an oxygen pressure of 100 pounds per square inch to precipitate 43.5 parts of black crystalline ferric oxide. After ferric oxide removal, the residual solution analyzed 14 parts iron; 35 parts magnesium plus calcium and aluminum; and 120 parts $HNO_3$.

EXAMPLE 6

A nitrate solution which contained 2.3 parts $Fe^{+++}$; 1 part $Cu^{++}$; 1.5 parts $Ni^{++}$; 0.2 part $Mn^{++}$; 0.6 part $Al^{+++}$; 13.1 parts $Mg^{++}$ and 9 parts free $NHO_3$ was heated at 175° C. for 30 minutes. All the iron was precipitated as substantially pure ferric oxide. The mixture was filtered after cooling. The filtrate contained less than 0.1 part iron; 1.0 part copper; 1.5 parts nickel; 0.2 part manganese; 0.6 part aluminum; 3.1 parts magnesium and 87 parts nitric acid.

EXAMPLE 7

A ferro-nickel alloy derived by smelting Oregon garnierite ore, contained:

| Component | Percent | Component | Percent |
|---|---|---|---|
| Iron | 73 | Chromium | 1 |
| Nickel and Cobalt | 25 | Silicon | 0.7 |
|  |  | Carbon | 2.3 |

100 parts of this finely ground ore was slurried and stirred in nitric acid solution, 331 parts $HNO_3$, and heated in a closed vessel at 135° C. under an oxygen partial pressure of 50 pounds per square inch gauge. Complete dissolution of iron, nickel, cobalt and chromium occurred within two hours. A small residue was separated by filtration. The solution, which contained 73 parts iron; 25 parts nickel and cobalt; 1.0 part chromium; and 25 parts free $HNO_3$ was heated at 210° C. 89% of the dissolved iron precipitated as pure ferric oxide. This was separated from the solution by filtration. The filtrate contained 25 parts nickel and cobalt; 8 parts iron; 1 part chromium and 246 parts free $HNO_3$.

I claim:

1. In a process for the production of ferric oxide from non-sulfide iron bearing material which contains a smaller amount of non-ferrous metal values in which the iron bearing material is leached with nitric acid leach solution at a temperature below about 250° C., undissolved residue is separated from the leach solution, clarified leach solution is heated at a temperature within the range of from about 50° C. to about 230° C. to precipitate dissolved iron values as ferric oxide, and precipitated ferric oxide is separated from the solution, the improvement which comprises the steps of heating the clarified iron bearing leach solution at a temperature within the range of from about 50° C. to about 250° C. under a partial pressure of oxygen above about 50 pounds per square inch to precipitate from the solution dissolved iron values as ferric oxide, terminating the heating step at a mol ratio of dissolved iron values to dissolved non-ferrous metal values greater than about 1:1 whereby ferric oxide substantially free from impurities is precipitated from the solution, separating precipitated ferric oxide from the solution substantially free from non-ferrous metal values, and recycling at least a portion of the residual iron bearing solution to the leaching step of the process.

2. The process according to claim 1 in which residual solution from the ferric oxide precipitation step is reacted with sulphuric acid to convert dissolved non-ferrous metal nitrates to sulphates and released nitric acid is recycled to the leaching step of the process.

3. The process according to claim 1 in which residual solution from the ferric oxide precipitation step is reacted with surphuric acid to convert dissolved non-ferrous metal nitrates to sulphates, released nitric acid is recycled to the leaching step of the process, non-ferrous metal sulphate bearing solution is reacted with hydrogen sulphide to precipitate dissolved non-ferrous metal values as sulphides, and precipitated non-ferrous metal sulphides are separated and recovered from the last mentioned solution.

4. The process according to claim 1 in which excess nitric acid contained in the clarified iron bearing leach solution is neutralized by the addition thereto of an excess of iron bearing material and undissolved iron bearing material is separated from the iron bearing solution and charged into the first mentioned leaching step of the process.

References Cited in the file of this patent

UNITED STATES PATENTS

| | | |
|---|---|---|
| 1,119,473 | Thacker | Dec. 1, 1914 |
| 1,503,229 | Clark | July 29, 1924 |
| 2,344,004 | Six | Mar. 14, 1944 |
| 2,643,204 | Mancke | June 23, 1953 |
| 2,739,040 | Mancke | Mar. 20, 1956 |
| 2,762,703 | Mancke | Sept. 11, 1956 |

FOREIGN PATENTS

| | | |
|---|---|---|
| 188,865 | Great Britain | Nov. 23, 1922 |